US010523587B2

(12) United States Patent
Park

(10) Patent No.: US 10,523,587 B2
(45) Date of Patent: Dec. 31, 2019

(54) COMMUNICATION PORTAL MANAGEMENT SYSTEM, COMMUNICATION PORTAL SERVER AND METHOD FOR A PORTAL SERVER MANAGEMENT

(71) Applicant: Yonho Park, Seoul (KR)

(72) Inventor: Yonho Park, Seoul (KR)

(73) Assignee: WITHINMILE, INC., Oakland, CA (US)

( * ) Notice: Subject to any disclaimer, the term of this patent is extended or adjusted under 35 U.S.C. 154(b) by 416 days.

(21) Appl. No.: 15/155,626

(22) Filed: May 16, 2016

(65) Prior Publication Data
US 2017/0237685 A1 Aug. 17, 2017

(30) Foreign Application Priority Data

Feb. 17, 2016 (KR) .......................... 10-2016-0018560

(51) Int. Cl.
H04L 12/927 (2013.01)
H04L 29/08 (2006.01)
(52) U.S. Cl.
CPC .............. H04L 47/80 (2013.01); H04L 67/02 (2013.01); H04L 67/06 (2013.01)
(58) Field of Classification Search
CPC .......................... G06F 17/3089; G06Q 30/0259
See application file for complete search history.

(56) References Cited

U.S. PATENT DOCUMENTS

2005/0251331 A1* 11/2005 Kreft ........................ G01C 3/08
701/438
2007/0100955 A1 5/2007 Bodner
(Continued)

FOREIGN PATENT DOCUMENTS

KR 10-2008-0049291 A 6/2008

OTHER PUBLICATIONS

Naver Real Estate, <http://land.naver.com/article/articleList.nhn?cortarNo=1168010100&rletTypeCd=A01&tradeTypeCd=> Accessed online on May 10, 2016.
(Continued)

Primary Examiner — William G Trost, IV
Assistant Examiner — Christopher P Cadorna
(74) Attorney, Agent, or Firm — Novick, Kim & Lee, PLLC; Sang Ho Lee

(57) ABSTRACT

A communication portal management system is provided. The communication portal management system includes a geographical address website management unit assigning a management authority of a geographical address website to at least one website operator, a server communication unit receiving a contents upload request from at least one website operator terminal, and a server management unit storing contents information corresponding to the contents upload request in a database unit. The geographical address website corresponds to a geographical address of the at least one website operator. The contents information and the geographical address website are matched in response to the contents upload request. Each of the at least one website operator terminal corresponds to each of the at least one website operator, respectively and communicates with a communication portal server to upload contents according to a predetermined conditions of the management authority. At least one user terminal transmits a contents transmit request input from a user to the communication portal server and receives contents in response to the contents transmit request from a plurality of contents uploaded in the communication portal server.

25 Claims, 6 Drawing Sheets

(56) References Cited

U.S. PATENT DOCUMENTS

| | | |
|---|---|---|
| 2008/0233927 A1 | 9/2008 | Moon |
| 2009/0063348 A1 | 3/2009 | Sequeira |
| 2014/0335898 A1 | 11/2014 | Moon |
| 2015/0339716 A1* | 11/2015 | Guevremont ...... G06Q 30/0259 705/14.45 |

OTHER PUBLICATIONS

Menupan Taste Map, <http://www.menupan.com/map/restmap/map_main.asp?ar=ss201> Accessed online on May 10, 2016.

* cited by examiner

FIG. 7

| Previous websites | Real estate | Discount | Jobs | Sell | Purchase |

Periods:
| 2015/2/5 - present time |
| 2013/ 3/8 - 2015/2/4 |
| 2011/5/12 - 2013/3/7 |
| 2009/ 11/5 - 2011/5/11 |

FIG. 8A

| Previous websites | Real estate | Discount | Jobs | Sell | Purchase |

Periods:
| 2013/ 3/8 - present time | Astro Burger |
| 2011/5/12 - 2013/3/7 | Paris bakery |
| 2009/ 11/5 - 2011/5/11 | Pretty toy store |

FIG. 8B

| Previous websites | Real estate | Discount | Jobs | Sell | Purchase |

Periods:
| 2015/2/5 - present time | Tinto |
| 2013/ 3/8 - 2015/2/4 | Astro Burger |
| 2011/5/12 - 2013/3/7 | Paris bakery |
| 2009/ 11/5 - 2011/5/11 | Pretty toy store |

COMMUNICATION PORTAL MANAGEMENT SYSTEM, COMMUNICATION PORTAL SERVER AND METHOD FOR A PORTAL SERVER MANAGEMENT

FIELD OF THE DISCLOSURE

The present disclosure relates to a communication portal management system, a communication portal server and a method for a portal server management, and more particularly, to a communication portal management system, a communication portal server and a management method thereof based on a geographical address, in which the communication portal server provides each website operator with a geographical address website corresponding to a geographical address of the website operator. If a website operator terminal for operating the geographical address website connects to the communication portal server and transmits a contents upload request, the communication portal server matches contents included in the contents upload request to the geographical address website and stores the contents in a database. If the communication portal server receives a request for specific contents from an internet user, the communication portal server provides the internet user with contents corresponding to the request. If a website operator corresponding to a geographical address is newly changed, the communication portal server grants a management authority in order to manage a geographical address website corresponding to the geographical address to a newly changed website operator. Contents uploaded and accumulated by at least one previous or current website operators granted with a management authority in order to manage the geographical address website in the past may also be provided through the communication portal server.

BACKGROUND OF THE DISCLOSURE

Generally, most people's behaviors and interests exist around a place corresponding to a specific geographical address such as a home or an office. Since people live, stay and works at a place corresponding to a specific geographical address directly associated with himself or herself, and participate in particular activities related to general living including eating, drinking and relaxation, there would be many occasions in which information related to a specific geographical address described above would be needed.

Conventionally, methods of searching for information through existing internet portal sites are generally used by someone in order to obtain answers to questions about a specific place corresponding to a certain geographical address from the internet. In addition, when a person participating in certain activities at a place corresponding to a specific geographical address, and they desire to let others know about the activity they are doing, it is common that the person would visit a website related to the activity so that the activity may be searched for through an existing internet portal site. However, although a person constructs a website related to an activity that corresponds to a specific geographical address in this manner and opens the website on the internet, a general portal system cannot match the website to a place corresponding to the specific geographical address, and although the person operating the website posts the contents that he or she desires to publicize, the general portal system cannot grasp what contents the person operating the website desires to publicize.

Furthermore, if the person operating the website moves to another location and participates in the same activity, the relation of the website to the previous geographical address is extinguished, and a general internet user who desires to know information related to the previous geographical address cannot obtain any information on the matters taken place in the past at the previous location. That is, if a person participating in an activity at a place that corresponds to a specific geographical address constructs a website related to the behavior he or she is doing and opens the website on the internet, it relates to the activity conducted at the place corresponding to a certain geographical address however, this does not mean that the website represents a corresponding geographical address itself. That is, a method of finding out things which have occurred at a certain geographical address in the past for an extended period of time does not exist at all.

Accordingly, required is a technique for providing information on a location corresponding to a specific geographical address to a person who desires to know information related to a place itself corresponding to a certain geographical address, such as information on a place corresponding to a specific geographical address related to general living and information generated in the past at a place corresponding to a certain geographical address. Also, required is a technique of allowing a person participating in a certain activity related to general living at a location corresponding to a specific geographical address to easily inform general internet users searching for information regarding the activity that the person is doing.

SUMMARY OF THE DISCLOSURE

Therefore, the present disclosure has been made in view of the above problems, and it is an object of the present disclosure to provide a communication portal management system, a communication portal server, and a method for portal server management.

A communication portal management system includes a geographical address website management unit assigning a management authority of a geographical address website to at least one website operator, wherein the geographical address website corresponds to a geographical address of the at least one website operator, a server communication unit receiving a contents upload request from at least one website operator terminal, and a server management unit storing contents information corresponding to the contents upload request in a database unit, wherein the contents information and the geographical address website are matched in response to the contents upload request, wherein each of the at least one website operator terminal corresponds to each of the at least one website operator, respectively and communicates with a communication portal server to upload contents according to a predetermined conditions of the management authority, and wherein at least one user terminal transmits a contents transmit request input from a user to the communication portal server and receives contents in response to the contents transmit request from a plurality of contents uploaded in the communication portal server.

According to another embodiment of the present disclosure, a communication portal server includes a geographical address website management unit assigning a management authority of a first geographical address website to a first website operator, wherein a geographical address corresponding to the first website operator is a first geographical address, and the first geographical address website corresponds to the first geographical address, a server communication unit receiving a first contents upload request from a first website operator terminal, and a server management unit storing first contents information corresponding to the contents upload request in a database unit, wherein the first contents information and the first geographical address website are matched in response to the first contents upload request.

When the first geographical address corresponding to the first website operator is authenticated as the first geographical address by a geographical address authentication unit, the geographical address website management unit may provide the first website operator with the first geographical address website.

The first contents information may include at least one of geographical address information, geographical address website information, website operator information, contents classification information, detailed contents classification information, detailed contents description information, and upload time information.

The first contents upload request may be generated from the first website operator terminal in accordance with a contents upload format provided by the server management unit.

When the first geographical address corresponding to the first website operator is changed to a second geographical address, the geographical address website management unit may assign a management authority of a second geographical address website to the first website operator. The second geographical address website may correspond to the second geographical address.

When a geographical address corresponding to a second website operator is changed to the first geographical address, the geographical address website management unit may assign the management authority of the first geographical address website to the second website operator.

The second website operator may use a second website operator terminal. When the server communication unit receives a second contents upload request from the second website operator terminal, the server management unit may match second contents information corresponding to the second contents upload request to the first geographical address website and store the second contents information in the database unit.

The server communication unit may receive a contents transmit request from a user terminal, and the server management unit provide the user terminal with at least one contents in response to the contents transmit request received from the user terminal to the server communication unit.

Upon receipt of the contents transmit request, the server management unit may provide the user terminal with the at least one contents corresponding to the contents transmit request according to upload time information or a website operator who has uploaded the at least one contents.

The contents transmit request may include information of a requested geographical address website, which provides the at least one contents. The server management unit may provide the user terminal with the at least one contents corresponding to the requested geographical address website according to upload time information or a website operator who has uploaded the contents.

The at least one contents from the requested geographical address website may include contents uploaded by at least one current or previous website operator assigned with a management authority of the requested geographical address website.

When a website operator corresponding to the first geographical address is changed, the geographical address website management unit may assign the management authority of the first geographical address website to a website operator who newly corresponds to the first geographical address, and the server management unit may provide a user terminal with contents uploaded by at least one current or previous website operator assigned with the management authority of the first geographical address website.

According to the other embodiment of the present disclosure, a communication portal server includes a geographical address website management unit providing a geographical address website corresponding to each geographical address, a server communication unit receiving a contents upload request from a website operator terminal, and a server management unit for storing contents information corresponding to the contents upload request in a database unit, if a management authority of the geographical address website is confirmed from the contents upload request.

When a website operator corresponding to the each geographical address is changed, the geographical address website management unit may assign a management authority of the each geographical address website to a website operator who newly corresponds to the each geographical address, and the server management unit may provide a user terminal with contents uploaded and accumulated by at least one current or previous website operator assigned with the management authority of the each geographical address website.

According to the other embodiment of the present disclosure, a method for a portal server management includes assigning, by a geographical address website management unit, a management authority of a first geographical address website to a first website operator, wherein a first geographical address is a geographical address corresponding to the first website operator and wherein the first geographical address website corresponds to the first geographical address, receiving, by a server communication unit, a first contents upload request from a first website operator terminal, matching, by a server management unit, first contents information in response to the first contents upload request to the first geographical address website, and storing, by a server management unit, the first contents information in a database unit.

When the geographical address corresponding to the first website operator is authenticated as the first geographical address by a geographical address authentication unit, the geographical address website management unit may provide the first website operator with the first geographical address website.

The first contents information may include at least one of geographical address information, geographical address website information, website operator information, contents classification information, detailed contents classification information, detailed contents description information and upload time information.

The first contents upload request may be generated from the first website operator terminal in accordance with a contents upload format provided by the server management unit.

The method for a portal server management may further include, when the geographical address corresponding to the first website operator is changed to a second geographical address, assigning, by the geographical address website management unit, a management authority of a second geographical address website corresponding to the second geographical address to the first website operator.

The method for a portal server management may further include, when a geographical address corresponding to a second website operator is changed to the first geographical address, assigning, by the geographical address website management unit, the management authority of the first geographical address website to the second website operator.

The method for a portal server management may further include, when the server communication unit may receive a second contents upload request from a second website operator terminal, matching second contents information corresponding to the second contents upload request to the first geographical address website, and storing, by the server management unit, the second contents information in the database unit.

The method for a portal server management may further include, receiving, by the server communication unit, a contents transmit request from a user terminal, and providing, by the server management unit, the user terminal with at least one contents corresponding to the contents transmit request.

Upon receipt of the contents transmit request, the server management unit may provide the user terminal with at least one contents corresponding to the contents transmit request according to upload time information or a website operator who has uploaded the at least one contents.

When information of a requested geographical address website is included in the contents transmit request, the server management unit may provide the user terminal with at least one contents corresponding to the requested geographical address website according to upload time information or a website operator who has uploaded the contents.

The at least one contents corresponding to the requested geographical address website may include contents uploaded by at least one current or previous website operator assigned with a management authority of the requested geographical address website.

When a website operator corresponding to the first geographical address is changed, the geographical address website management unit may assign the management authority of the first geographical address website corresponding to the first geographical address to a website operator newly corresponding to the first geographical address, and the server management unit may provide a user terminal with contents uploaded and accumulated by at least one current or previous website operator assigned with the management authority of the first geographical address website.

According to the other embodiment of the present disclosure, a non-statutory computer-readable medium may have stored thereon instructions that, if executed by a process, causes the processor to execute a method for a portal server management. The method may include assigning, by a geographical address website management unit, a management authority of a first geographical address website to a first website operator, wherein a first geographical address is a geographical address corresponding to the first website operator and wherein the first geographical address website corresponds to the first geographical address, receiving, by a server communication unit, a first contents upload request from a first website operator terminal, matching, by a server management unit, first contents information in response to the first contents upload request to the first geographical address website, and storing, by a server management unit, the first contents information in a database unit. To accomplish the above objects, according to one aspect of the present disclosure, there is provided a communication portal server including: a geographical address website management unit for granting, when a geographical address corresponding to a first website operator is a first geographical address, a management authority of a first geographical address website corresponding to the first geographical address to the first website operator, a server communication unit for receiving a first contents upload request from a first website operator terminal, and a server management unit for matching first contents information corresponding to the first contents upload request to the first geographical address website and storing the first contents information in a database unit.

BRIEF DESCRIPTION OF THE DRAWINGS

FIG. 7 is a schematic diagram showing a screen for providing past website information at a geographical address website according to an embodiment of the present disclosure.

FIGS. 8A and 8B are schematic diagrams showing a screen for providing past website information at a geographical address website according to another embodiment of the present disclosure.

DETAILED DESCRIPTION

Figure 1:
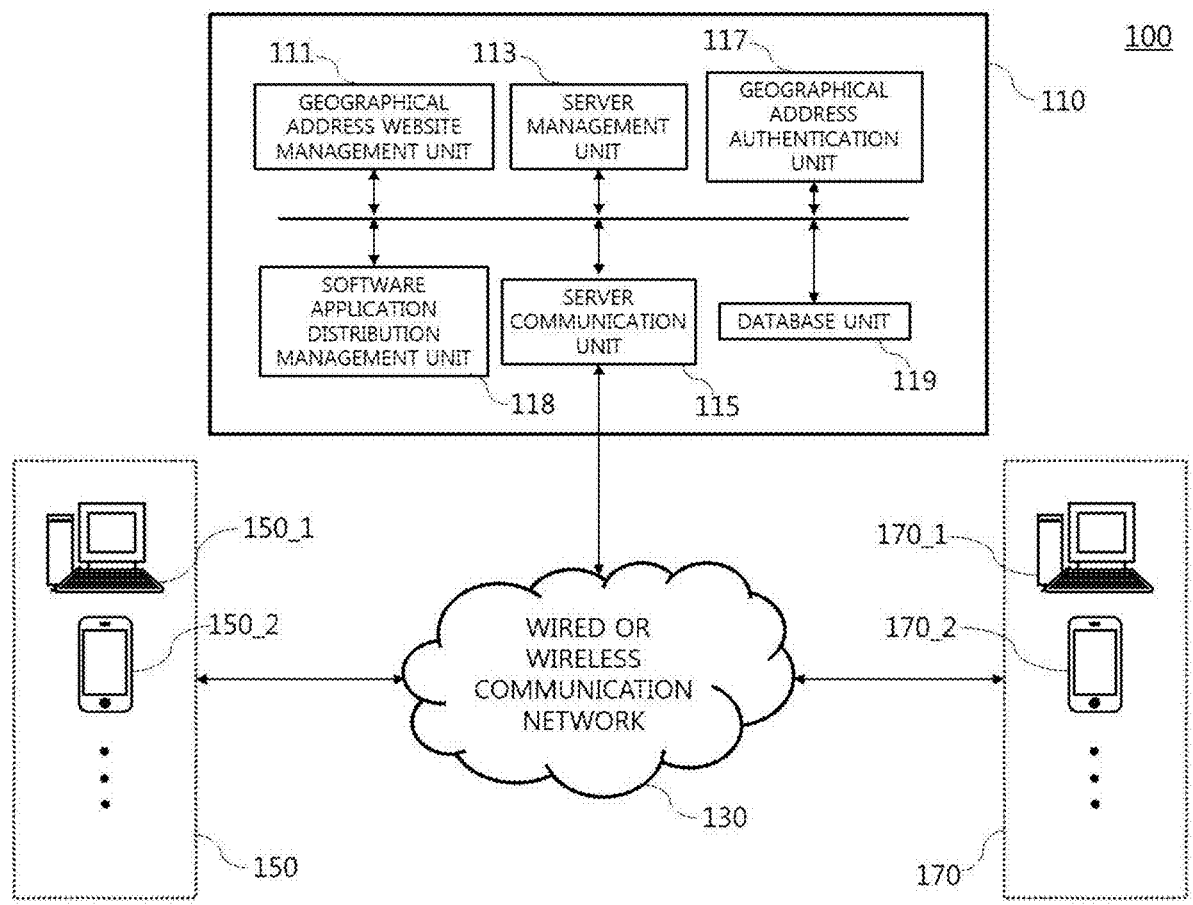
FIG. 1 is a brief block-diagram depicting a communication portal management system according to an embodiment of the present disclosure.

Reference will now be made in detail to embodiments of the present invention, examples of which are illustrated in the accompanying drawings, wherein like reference numerals refer to the like elements throughout the several views. In this regard, the present embodiments may have different forms and should not be construed as being limited to the descriptions set forth herein. Accordingly, the embodiments are merely described below, by referring to the figures, to explain aspects of the present description. Terms used herein are for descriptive purposes only and are not intended to limit the scope of the invention. The terms "comprises" and/or "comprising" are used to specify the presence of stated elements, steps, operations, and/or components, but do not preclude the presence or addition of one or more other elements, steps, operations, and/or components. The terms "first," "second," and the like may be used to describe various elements, but do not limit the elements. Such terms are only used to distinguish one element from another. These and/or other aspects become apparent and are more readily appreciated by those of ordinary skill in the art from the following description of embodiments of the present invention, taken in conjunction with the accompanying drawings. In order to fully understand the present disclosure, operational advantages of the present disclosure, and objects achieved by the implementation of the present disclosure, the accompanying drawings illustrating the embodiments of the present disclosure and the contents described in the accompanying drawings need to be referred to.

The present disclosure will be described hereinafter in detail by describing the preferred embodiments of the present disclosure. Like reference numerals presented in each of the drawings denotes like elements.

FIG. 1 is a brief block-diagram depicting a communication portal management system according to an embodiment of the present disclosure. Referring to FIG. 1, a communication portal management system 100 according to an embodiment of the present disclosure may include a communication portal server 110, at least one website operator terminal 150 and at least one user terminal 170. As shown in FIG. 1, the communication portal server 110, the at least one website operator terminal 150 and the at least one user terminal 170 may wiredly or wirelessly communicate with each other using a wired or wireless communication network 130. The wired or wireless communication network 130 is a communication network capable of communicating wiredly or wirelessly, and since it is known to those skilled in the art, details thereof will be omitted.

The communication portal server 110 may include a geographical address website management unit 111 and a server management unit 113. In addition, according to another embodiment of the present disclosure, the communication portal server 110 may further include a server communication unit 115, a geographical address authentication unit 117, a software application distribution management unit 118, and a database unit 119.

The geographical address website management unit 111 may provide a geographical address website corresponding to a geographical address. The geographical address website management unit 111 may grant a management authority of a geographical address website corresponding to a geographical address of each at least one website operator to the at least one website operator. For example, when the geographical address corresponding to a first website operator is a first geographical address, the geographical address website management unit 111 may grant a management authority of a first geographical address website corresponding to the first geographical address to the first website operator. The first website operator may connect to the communication portal server 110 using a first website operator terminal 150_1, join the communication portal server 110 as a website operator, and input website operator information and the geographical address when the first website operator joins as a member. For example, the geographical address corresponding to the website operator may be a geographical address where a business office or the like of the website operator is located, and the Uniform Resource Locator (URL) of the geographical address website may be formed like www.addressmatch.com/geoaddress, and the "geoaddress" part may be changed diversely according to each geographical address. According to another embodiment of the present disclosure, the Uniform Resource Locator corresponding to the each website operator may be provided to the each website operator respectively, and redirected to another Uniform Resource Locator such as the Uniform Resource Locator of the geographical address website corresponding to the web site operator.

According to another embodiment of the present disclosure, when the geographical address corresponding to the first website operator is authenticated as the first geographical address by the geographical address authentication unit 117, the geographical address website management unit 111 may provide the first website operator with the first geographical address website. For example, when the geographical address corresponding to the first website operator is authenticated as the first geographical address by the geographical address authentication unit 117, the geographical address website management unit 111 may generate the first geographical address website and grant a management authority of the first geographical address website to the first website operator. When the geographical address corresponding to the first website operator is authenticated as the first geographical address by analyzing data received from the first website operator terminal 150_1 or documents (e.g., a business license and the like) submitted by the first website operator when the first website operator joins as a member, the geographical address authentication unit 117 may transmit a result of geographical address authentication to the geographical address website management unit 111. The geographical address authentication unit 117 may extract the name and the geographical address of the first website operator by analyzing the data received from the first website operator terminal 150_1. The geographical address authentication unit 117 may further include a scanner or the like for scanning documents and converting scanned data into electronic data in order to analyze the documents submitted by the first website operator.

In addition, when the geographical address corresponding to the first website operator is changed from the first geographical address to a second geographical address, the geographical address website management unit 111 may grant a management authority of a second geographical address website corresponding to the second geographical address to the first website operator and withdraw the management authority of the first geographical address website corresponding to the first geographical address from the first website operator. In addition, when a geographical address corresponding to a second website operator is changed to the first geographical address, the geographical address website management unit 111 may grant a management authority of the first geographical address website to the second website operator. That is, when website operators corresponding to the first geographical address are changed, the geographical address website management unit 111 may grant a management authority of the first geographical address website corresponding to the first geographical address to a website operator newly assigned to the first geographical address. The server management unit 113 may also provide at least one user terminal 170 with contents uploaded and accumulated by at least one previous or current website operators granted with the management authority of the first geographical address website. For example, the server management unit 113 may also provide the contents uploaded and accumulated by at least one previous or current website operators granted with the management authority of the first geographical address website through the first geographical address website.

When a website operator corresponding to a geographical address is newly changed, the geographical address website management unit 111 may grant a management authority of a geographical address website corresponding to the geographical address to a website operator newly assigned to the geographical address. The server management unit 113 may also provide at least one user terminal 170 with the contents uploaded and accumulated by at least one previous or current website operators granted with a management authority of the geographical address website. For example, the server management unit 113 may also provide the contents uploaded and accumulated by at least one previous or current website operators granted with a management authority of the geographical address website through the geographical address website. Accordingly, the communication portal management system 100 according to an embodiment of the present disclosure is effective in that although operators of a geographical address website corresponding to a geographical address are changed, the contents information accumulated by at least one previous or current website operators may be provided through a geographical address website corresponding to the same geographical address.

Data on the geographical address website generated by the geographical address website management unit 111 and the management authority of the geographical address website may be stored in the database unit 119 together with information on the website operator name, website operator information, the geographical address of the website operator and the like.

The server management unit 113 may receive a contents upload request from at least one website operator terminal 150 through the server communication unit 115 and store contents information corresponding to the contents upload request in the database unit 119. For example, the server management unit 113 may match the contents information to a geographical address website corresponding to the contents upload request and store the contents information in the database unit 119. Here, the contents information corresponds to the contents upload request. The contents upload request may include at least one of information on the website operator and information on the management authority of the geographical address website, and the server management unit 113 may find out the geographical address website corresponding to the contents upload request. For example, if the management authority of the geographical address website is confirmed from the contents upload request, the server management unit 113 may store the contents information corresponding to the contents upload request in the database unit 119. For example, if the management authority of the geographical address website is confirmed from the contents upload request, the server management unit 113 may match the contents information to a geographical address website corresponding to the confirmed management authority of the geographical address website and store the contents information in the database unit 119. For example, the contents information may include at least one of geographical address information, geographical address website information, website operator information, contents classification information, detailed contents classification information, detailed contents description information and upload time information.

Meanwhile, in the event that the website operator moves to another geographical address or cancels the membership, the server management unit 113 may withdraw the management authority of the geographical address website from the website operator. The server management unit 113 may grant the withdrawn management authority of the geographical address website to another website operator through the operations described above.

The server communication unit 115 may wiredly or wirelessly communicate with at least one website operator terminal 150 and at least one user terminal 170 through the wired or wireless communication network 130 to transmit and receive data. The server communication unit 115 may receive a contents upload request from the at least one website operator terminal 150 and receive a contents transmit request from the at least one user terminal 170. The server communication unit 115 may be implemented as a wired internet communication module supporting TCP/IP or the like or a communication module supporting at least one of various wireless communication methods such as Wideband Code Division Multiple Access (WCDMA), Long Term Evolution (LTE), Wireless Broadband Internet (Wi-Bro), Wireless Fidelity (WiFi) and the like. The server communication unit 115 may be implemented as a communication module supporting at least one of the various communication methods described above and may be diversely modified within the scope well-known to those skilled in the art.

When the server communication unit 115 receives the contents transmit request from at least one user terminal 170, the server management unit 113 may provide the at least one user terminal 170 with at least one contents corresponding to the contents transmit request. For example, upon receipt of the contents transmit request, the server management unit 113 may provide the at least one user terminal 170 with at least one contents according to the upload time information or the website operator who has uploaded the contents. For example, when information on a requested geographical address website is included in the contents transmit request, the server management unit 113 may provide the user terminal 170 with at least one contents corresponding to the requested geographical address website. For example, when information on the requested geographical address website is included in the contents transmit request, the server management unit 113 may provide the at least one user terminal 170 with at least one contents corresponding to the requested geographical address website according to the upload time information or the website operator who has uploaded the contents. The requested geographical address website is a geographical address website selected by the user using the user terminal 170, which may be a geographical address website at which the user desires to receive the contents. If the user connects to the communication portal server 110 using the user terminal 170 and clicks or selects a requested geographical address website, information on the selected geographical address website may be included in the contents transmit request as the requested geographical address website and transmitted to the server communication unit 115. The at least one contents corresponding to the requested geographical address website may include all or some of the contents uploaded by at least one website operator granted with a management authority of the requested geographical address website in the past.

Meanwhile, the contents transmit request may include information on a plurality of requested geographical address websites. When information on the plurality of requested geographical address websites is included in the contents transmit request, the server management unit 113 may provide the user terminal 170 with at least one contents corresponding to the plurality of requested geographical address websites. For example, the at least one of the contents corresponding to the plurality of requested geographical address websites may be classified and provided to the user terminal 170 according to at least one of contents classification, a geographical address website, the upload time information, and a website operator who has uploaded the contents.

The software application distribution management unit 118 may distribute and manage a software application for connecting to the communication portal server 110 by the at least one website operator terminal 150 and the at least one user terminal 170. The at least one website operator terminal 150 and the at least one user terminal 170 may download the software application for connecting to the communication portal server 110 through the software application distribution management unit 118.

The database unit 119 may store various data needed for operating the communication portal server 110, such as information on the geographical address website generated by the geographical address website management unit 111 and a management authority of the geographical address website, information on the membership of the website operator and the user and the like and may be implemented by various data storage devices well-known to those skilled in the art.

Meanwhile, the geographical address website management unit 111, the server management unit 113, the geographical address authentication unit 117 and the software application distribution management unit 118 are components of the communication portal server 110 and may be implemented and operated by a software application program stored and executed in the communication portal server 110.

The at least one website operator terminal 150 may correspond to the at least one website operator respectively and communicate with the communication portal server 110 to upload contents corresponding to the management authority of the geographical address website granted to the at least one website operator. Each website operator may connect to the communication portal server 110 through the website operator terminal 150 and join the communication portal server 110 as a website operator, and information on the membership may be stored in the database unit 119.

The at least one website operator terminal 150 may communicate with the communication portal server 110 through the software application downloaded from the software application distribution management unit 118 and upload contents corresponding to the management authority of the geographical address website granted to the at least one website operator. The at least one website operator terminal 150 may be various types of terminals or electronic devices capable of wired or wireless data communication, such as a personal computer (PC), a cellular phone, a smart phone, a tablet PC, a vehicle navigator and the like, and may be diversely modified within the scope well-known to those skilled in the art. Although only a first website operator terminal 150_1 and a second website operator terminal 150_2 are shown in FIG. 1, this is only for illustrative purpose, and the communication portal management system 100 according to an embodiment of the present disclosure may include three or more website operator terminals.

The at least one user terminal 170 may transmit a contents transmit request input from the user to the communication portal server 110 and receive contents corresponding to the contents transmit request among the contents uploaded to the communication portal server 110. Each user may connect to the communication portal server 110 through the user terminal 170 and join the communication portal server 110 as a user, and information on the membership may be stored in the database unit 119. However, this is only for illustrative purposes, and each user may connect to the communication portal server 110 and search for contents without becoming a member.

The at least one user terminal 170 may transmit the contents transmit request to the communication portal server 110 and receive contents corresponding to the contents transmit request through the software application downloaded from the software application distribution management unit 118. The at least one user terminal 170 may be various types of terminals or electronic devices capable of wired or wireless data communication, such as a personal computer (PC), a cellular phone, a smart phone, a tablet PC, a vehicle navigator and the like, and may be diversely modified within the scope well-known to those skilled in the art. Although only a first user terminal 170_1 and a second user terminal 170_2 are shown in FIG. 1, this is only for illustrative purposes, and the communication portal management system 100 may include three or more user terminals.

Meanwhile, some of website operators corresponding to the at least one website operator terminal 150 and some of users corresponding to the at least one user terminal 170 shown in FIG. 1 may be the same persons, and some of the at least one website operator terminal 150 may correspond to some of the at least one user terminal 170.

The operation of the communication portal management system 100 shown in FIG. 1 will be additionally described in detail with reference to FIGS. 2 and 3.

Figure 2:
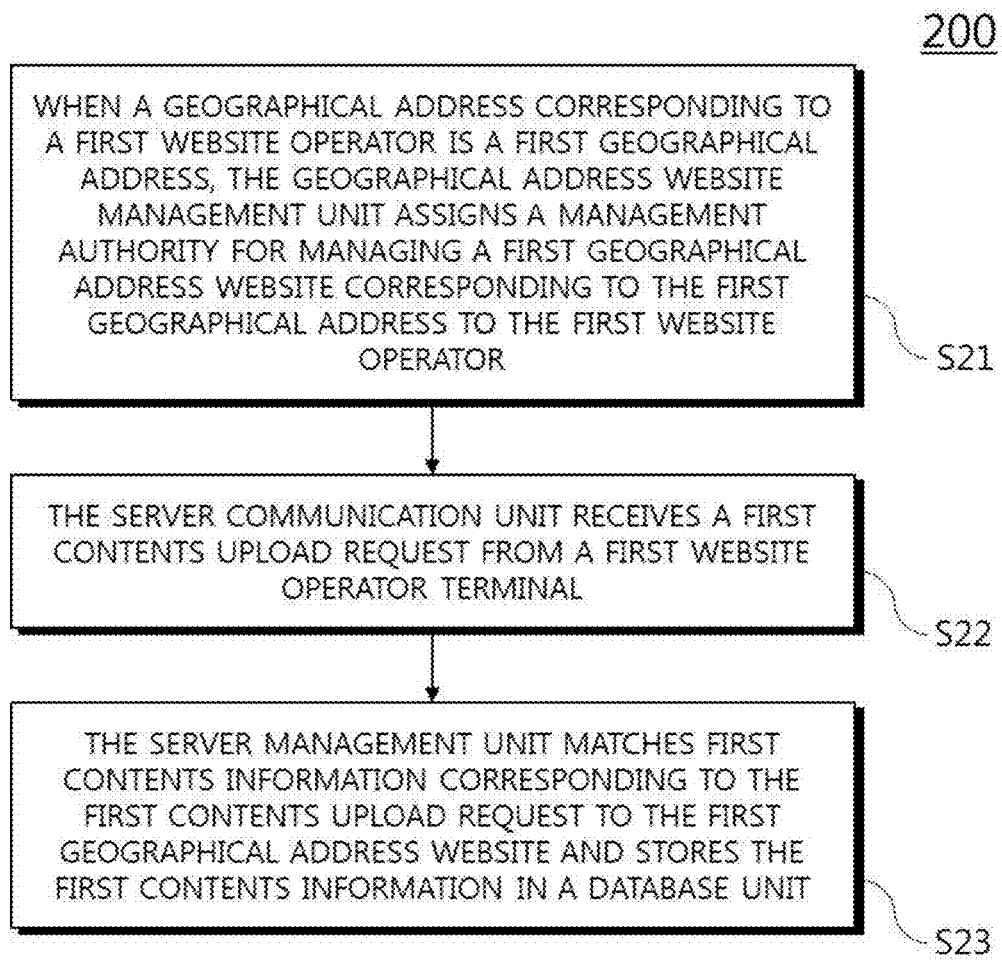
FIG. 2 is a flowchart illustrating a communication portal server management method according to an embodiment of the present disclosure.

FIG. 2 is a flowchart illustrating a communication portal server management method according to an embodiment of the present disclosure. For example, a communication portal server management method 200 according to an embodiment of the present disclosure shown in FIG. 2 may be performed by the communication portal server 110 described above with reference to FIG. 1.

Referring to FIG. 2, a communication portal server management method 200 according to an embodiment of the present disclosure may include the step S21 of assigning a management authority R1 for managing a first geographical address website W1 corresponding to a first geographical address A1 to the first website operator N1 by the geographical address website management unit 111 when the geographical address corresponding to a first website operator N1 is the first geographical address A1. For example, the management authority R1 for managing the first geographical address website W1 may be a management authority capable of uploading contents to the first geographical address website W1.

Data on the first website operator N1 may be stored in the database unit 119 in the form as shown in Table 1, and when a website operator is added, data on the added website operator may be additionally stored in the database unit 119 in the form as shown in Table 1. First website operator information K1, which is diverse information related to the first website operator N1, may be included in the website operator information.

TABLE 1

| Website operator | Geographical address of website operator | Geographical address website | Management authority of geographical address website | Website operator information |
|---|---|---|---|---|
| N1 | A1 | W1 | R1 | K1 |

For example, when the geographical address corresponding to the first website operator N1 is authenticated as the first geographical address A1 by the geographical address authentication unit 117, the geographical address website management unit 111 may generate the first geographical address website W1 and grant a management authority R1 for managing the first geographical address website W1 to the first website operator N1. However, data types shown in Table 1 are only for illustrative purposes, and data types related to website operators stored in the database unit 119 may be diversely modified. In addition, the first geographical address website W1 may be generated in advance before the geographical address corresponding to the first website operator N1 is authenticated as the first geographical address A1.

Next, the communication portal server management method 200 according to an embodiment of the present disclosure may include the step S22 of receiving a first contents upload request from the first website operator terminal 150_1 by the server communication unit 115. The first contents upload request may be generated at the first website operator terminal 150_1 by the first website operator N1 according to a contents upload format provided by the server management unit 113.

The first website operator N1 may log into a portal site provided by the communication portal server 110 by inputting an account ID and a password after connecting to the communication portal server 110 through the first website operator terminal 150_1 and joining as a member. If authentication on the geographical address is completed when the first website operator N1 joins as a member, it may be considered that authentication on the first geographical address A1 is carried out when the first website operator N1 logs into the portal site at a later time.

The at least one of the information on the first website operator N1 and information on the management authority R1 for managing the first geographical address website W1, as well as first contents information, may be included in the first contents upload request. The first website operator N1 may transmit the first contents upload request after logging into the portal site provided by the communication portal server 110. At least one of the information on the first website operator N1 and the information on the management authority R1 for managing the first geographical address website W1 may be included in the first contents upload request based on the login information of the first website operator N1.

Next, the communication portal server management method 200 according to an embodiment of the present disclosure may include the step S23 of matching first contents information corresponding to the first contents upload request to the first geographical address website W1 and storing the first contents information in the database unit 119 by the server management unit 113.

For example, since the first website operator N1 is in a state of connecting to and logging into the communication portal server 110, if the first contents upload request transmitted from the first website operator terminal 150_1 is received, the server management unit 113 may match the first contents information included in the first contents upload request to the first geographical address website W1 and store the first contents information in the database unit 119 without an additional process of confirming the management authority.

In another embodiment, if the management authority R1 for managing the first geographical address website W1 is confirmed from the first contents upload request, the server management unit 113 may match first contents information corresponding to the first contents upload request to the first geographical address website W1 and store the first contents information in the database unit 119. Since at least one of the information on the first website operator N1 and the information on the management authority R1 for managing the first geographical address website W1 may be included in the first contents upload request, the server management unit 113 may confirm the management authority R1 for managing the first geographical address website W1 from the first contents upload request. Since the server management unit 113 may confirm that the first website operator N1 is granted with the management authority R1 for managing the first geographical address website W1 through the database unit 119, the server management unit 113 may accept the first contents upload request received from the first website operator terminal 150_1 and store the first content information corresponding to the first contents upload request in the database unit 119. When a website operator who has not been granted with the management authority R1 for managing the first geographical address website W1 transmits a contents upload request to upload contents to the first geographical address website W1, the server management unit 113 may reject the invalid contents upload request after confirming the management authority R1 for managing the first geographical address website W1 through the database unit 119.

The first contents information may be included in the first contents upload request and may include at least one of the geographical address information, geographical address website information, website operator information, contents classification information, detailed contents classification information, detailed contents description information, and upload time information. For example, since the first contents information is transmitted from the first website operator terminal 150_1, the geographical address information included in the first contents information may be the first geographical address A1, the geographical address website information may be the first geographical address website W1, and the website operator information may be the first website operator N1. In addition, the contents classification information included in the first contents information may be a first contents classification S1, the detailed contents classification information included in the first contents information may be a first detailed contents classification P1, the detailed contents description information included in the first contents information may be a first detailed contents description D1, and the upload time information included in the first contents information may be a first upload time T1. Accordingly, if the name of the first contents is C1, data related to the first contents information may be stored in the database unit 119 in the form as shown in Table 2.

TABLE 2

| Contents name | Geographical address | Geographical address website | Website operator | Contents classification | Detailed contents classification | Detailed contents description | Upload time |
|---|---|---|---|---|---|---|---|
| C1 | A1 | W1 | N1 | S1 | P1 | D1 | T1 |

For example, "Real estate", "Discount", "Jobs", "Sell", "Purchase" or the like may be included in the contents classification information. Contents whose contents classification information is "Real estate" may be contents related to sale, lease or the like of a real estate, contents whose contents classification information is "Discount" may be contents related to discount of a sale product or the like, and contents whose contents classification information is "Jobs" may be contents including information on searching for a worker or a job. Contents whose contents classification information is "Sell" may be contents including a description on selling a product, and contents whose contents classification information is "Purchase" may be contents including a description on purchasing a product. For example, the first contents classification S1, which is contents classification information included in the first contents information, may be any one of the contents classifications described above.

The detailed contents classification information may include a different detailed classification according to the contents classification information. For example, if the contents classification information is "Real estate", the detailed contents classification information may include information on "Sale" or "Lease", if the contents classification information is "Discount", the detailed contents classification information may include information on a discount product, and if the contents classification information is "Jobs", the detailed contents classification information may include information on "regular job", "part time job", "non-regular job", "temporary job", "side job" and the like. If the contents classification information is "Sell" or "Purchase", the detailed contents classification information may include information on a type of a product such as a computer, a vehicle or the like. For example, the first detailed contents classification P1, which is detailed contents classification information included in the first contents information, may be any one of the detailed contents classifications described above. According to another embodiment of the present disclosure, the detailed contents classification information may be formed in a plurality of levels or layers.

Detailed descriptions input by a website operator in relation to corresponding contents may be stored in the detailed contents description information, and the time of uploading the corresponding contents may be stored in the upload time information.

The server management unit 113 may provide the website operator terminal 150 with information on the contents classification and the detailed contents classification through the server communication unit 115. The website operator may select any one of the contents classification and the detailed contents classification using the website operator terminal 150 and generate a contents upload request by inputting a contents name, a detailed contents description and the like. Detailed items of the contents classification and the detailed contents classification may be stored in the database unit 119 and may be modified diversely.

Figure 3:
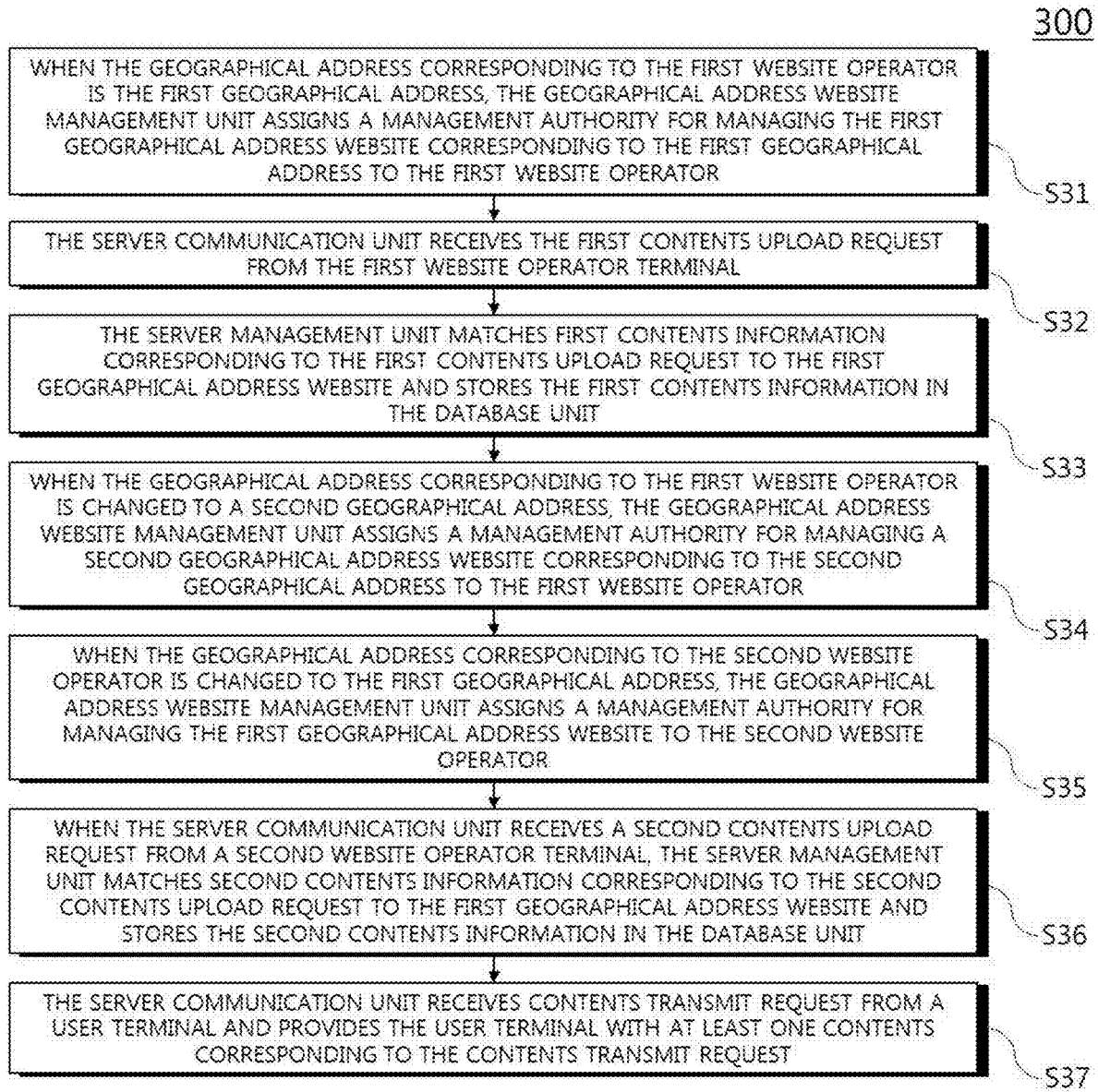
FIG. 3 is a flowchart illustrating a communication portal server management method according to another embodiment of the present disclosure.

Meanwhile, although it is not shown in FIG. 2, the communication portal server management method 200 according to an embodiment of the present disclosure may further include the step of receiving a contents transmit request from the user terminal 170 by the server communication unit 115 and providing the user terminal 170 with at least one contents corresponding to the contents transmit request in a manner similar to step S37 shown in FIG. 3, by the server management unit 113.

A first user may connect to a portal site provided by the server management unit 113 through the first user terminal 170_1 or transmit a contents transmit request to the server communication unit 115 through an application program downloaded from the software application distribution management unit 118.

For example, the first user may select a region for searching for contents, a type of contents that the user desires to search for and the like and generate and transmit a contents transmit request to the server communication unit 115. Accordingly, the server management unit 113 may provide the first user terminal 170_1 with contents corresponding to the contents transmit request. In addition, the contents transmit request may further include detailed contents classification information, keyword information, period information and the like. That is, the user may search for contents classified in more detail according to the detailed contents classification information, search for contents including a keyword input by the user according to the keyword information, and search for contents corresponding to a specific period desired by the user to search for according to the period information.

In addition, when information on the requested geographical address website is included in the contents transmit request, the server management unit 113 may provide the first user terminal 170_1 with at least one of the contents corresponding to the requested geographical address website. For example, at least one of the contents corresponding to the requested geographical address website may be sequentially sorted according to upload time information and provided to the first user terminal 170_1. In addition, if different website operators have uploaded the contents, at least one of the contents corresponding to the requested geographical address website may be classified according to the website operators who have uploaded the contents and provided to the first user terminal 170_1. The at least one of the contents corresponding to the requested geographical address website may include all or some of the contents uploaded by at least one website operator granted with a management authority of the requested geographical address website in the past. Accordingly, the user may be provided with a result accumulating the contents uploaded by at least one previous or current website operators of a corresponding geographical address website even when website operators of a geographical address website that the user desires to view are changed.

FIG. 3 is a flowchart illustrating a communication portal server management method according to another embodiment of the present disclosure. For example, a communication portal server management method 300 according to another embodiment of the present disclosure shown in FIG. 3 may be performed by the communication portal server 110 described above with reference to FIG. 1.

Referring to FIG. 3, steps S31, S32 and S33 included in the communication portal server management method 300 according to another embodiment of the present disclosure may be similar to steps S21, S22 and S23 described above with reference to FIG. 2.

Next, the communication portal server management method 300 according to another embodiment of the present disclosure may further include the step S34 of assigning, when the geographical address corresponding to the first website operator N1 is changed to a second geographical address A2, a management authority R2 for managing a second geographical address website W2 corresponding to the second geographical address A2 to the first website operator N1 by the geographical address website management unit 111. When the geographical address corresponding to the first website operator N1 is changed from the first geographical address A1 to the second geographical address A2, the geographical address website management unit 111 may withdraw the management authority R1 for managing the first geographical address website W1 corresponding to the first geographical address A1 from the first website operator N1. That is, when the location of a business office of the first website operator N1 is changed from the first geographical address A1 to the second geographical address A2 due to moving or the like, the data on the website operator shown in Table 1 may be changed as shown in Table 3 and stored in the database unit 119.

TABLE 3

| Website operator | Geographical address of website operator | Geographical address website | Management authority of geographical address website | Website operator information |
|---|---|---|---|---|
| N1 | A2 | W2 | R2 | K1 |

When it is confirmed by the geographical address authentication unit 117 that the geographical address corresponding to the first website operator N1 is changed to the second geographical address A2, the geographical address website management unit 111 may generate a second geographical address website W2 and grant a management authority R2 for managing the second geographical address website W2 to the first website operator N1. First website operator information K1, which is diverse information related to the first website operator N1, may be included in the website operator information. According to another embodiment of the present disclosure, the second geographical address website W2 may be generated in advance before the geographical address corresponding to the first website operator N1 is authenticated as the second geographical address A2.

Next, the communication portal server management method 300 according to another embodiment of the present disclosure may further include the step S35 of assigning, when the geographical address corresponding to the second website operator N2 is changed to the first geographical address A1, the management authority R1 for managing the first geographical address website W1 to the second website operator N2 by the geographical address website management unit 111. That is, when website operators corresponding to the first geographical address A1 are changed, the geographical address website management unit 111 may grant the management authority R1 for managing the first geographical address website W1 corresponding to the first geographical address A1 to a website operator newly assigned to the first geographical address A1. For example, when the second website operator N2 newly moves to the first geographical address A1 which remains empty after the first website operator N1 leaves, the data on the website operator shown in Table 3 may be changed as shown in Table 4 and stored in the database unit 119.

TABLE 4

| Website operator | Geographical address of website operator | Geographical address website | Management authority of geographical address website | Website operator information |
|---|---|---|---|---|
| N1 | A2 | W2 | R2 | K1 |
| N2 | A1 | W1 | R1 | K2 |

When it is confirmed by the geographical address authentication unit 117 that the geographical address corresponding to the second website operator N2 is changed to the first geographical address A1, the geographical address website management unit 111 may grant the management authority R1 for managing the first geographical address website W1 to the second website operator N2. Second website operator information K2, which is diverse information related to the second website operator N2, may be included in the website operator information corresponding to the second website operator N2. According to another embodiment of the present disclosure, the database unit 119 may further store geographical address change history of each website operator, website operator change history of each geographical address website and the like.

Next, the communication portal server management method 300 according to another embodiment of the present disclosure may further include the step S36 of matching, when the server communication unit 115 receives a second contents upload request from the second website operator terminal 150_2, second contents information corresponding to the second contents upload request to the first geographical address website W1 and storing the second contents information in the database unit 119.

For example, since the second website operator N2 is in a state of connecting to and logging into the communication portal server 110, if the second contents upload request transmitted from the second website operator terminal 150_2 is received, the server management unit 113 may match the second contents information included in the second contents upload request to the first geographical address website W1 and store the second contents information in the database unit 119 without an additional process of confirming the management authority.

In another embodiment, if the management authority R1 for managing the first geographical address website W1 is confirmed from the second contents upload request, the server management unit 113 may match the second contents information corresponding to the second contents upload request to the first geographical address website W1 and store the second contents information in the database unit 119.

At least one of the information on the second website operator N2 and the information on the management authority R1 for managing the first geographical address website W1, as well as the second contents information, may be included in the second contents upload request. In addition, as another example, information on the second website operator N2 and the second contents information may be included in the second contents upload request, and the server management unit 113 may confirm that the second website operator N2 that has transmitted the second contents upload request has the management authority R1 for managing the first geographical address website W1 through the database unit 119.

That is, since data on the website operator is stored in the database unit 119 as shown in Table 4, the server management unit 113 may confirm that the second website operator N2 is granted with the management authority R1 for managing the first geographical address website W1 through the database unit 119. Accordingly, the server management unit 113 may accept the second contents upload request received from the second website operator terminal 150_2, and match the second contents information corresponding to the second contents upload request to the first geographical address website W1, and store the second contents information in the database unit 119. For example, when the first website operator N1 transmits a contents upload request to upload contents to the first geographical address website W1, the server management unit 113 may confirm that the first website operator N1 does not possess the management authority R1 for managing the first geographical address website W1 any more through the database unit 119 and reject the contents upload request of the first website operator N1.

The second contents upload request may be generated at the second website operator terminal 150_2 by the second website operator N2 according to a contents upload format provided by the server management unit 113.

The second contents information may be included in the second contents upload request and, like the first contents information, may include at least one of the geographical address information, geographical address website information, website operator information, contents classification information, detailed contents classification information, detailed contents description information and upload time information. For example, since the second contents information is transmitted from the second website operator terminal 150_2, the geographical address information included in the second contents information may be the first geographical address A1, the geographical address website information may be the first geographical address website W1, and the website operator information may be the second website operator N2. In addition, the contents classification information included in the second contents information may be a second contents classification S2, the detailed contents classification information included in the second contents information may be a second detailed contents classification P2, the detailed contents description information included in the second contents information may be a second detailed contents description D2, and the upload time information included in the second contents information may be a second upload time T2. Accordingly, if the name of the second contents is C2, data related to the second contents information may be stored in the database unit 119, in addition to the data related to the first contents information shown in Table 2, in the form as shown in Table 5.

TABLE 5

| Contents name | Geographical address | Geographical address website | Website operator | Contents classification | Detailed contents classification | Detailed contents description | Upload time |
|---|---|---|---|---|---|---|---|
| C1 | A1 | W1 | N1 | S1 | P1 | D1 | T1 |
| C2 | A1 | W1 | N2 | S2 | P2 | D2 | T2 |

For example, "Real estate", "Discount", "Jobs", "Sell", "Purchase" or the like may be included in the contents classification information, and the second contents classification S2, which is contents classification information included in the second contents information, may be any one of the contents classifications described above. In addition, the detailed contents classification information may include a different detailed classification according to the contents classification information, and the second detailed contents classification P2, which is detailed contents classification information included in the second contents information, may be any one of the detailed contents classifications described above. Detailed descriptions input by a website operator in relation to corresponding contents may be stored in the detailed contents description information, and the time of uploading the corresponding contents may be stored in the upload time information.

Next, the communication portal server management method 300 according to another embodiment of the present disclosure may further include the step S37 of receiving a contents transmit request from the user terminal 170 by the server communication unit 115 and providing the user terminal 170 with at least one contents corresponding to the contents transmit request by the server management unit 113. The user may connect to a portal site provided by the server management unit 113 through the user terminal 170 and transmit the contents transmit request to the server communication unit 115. The user may transmit the contents transmit request to the server communication unit 115 through an application program downloaded from the software application distribution management unit 118. For example, the server management unit 113 may provide the user terminal 170 with at least one contents corresponding to the contents transmit request according to the upload time information or the website operator who has uploaded the contents.

For example, when information on the requested geographical address website is included in the contents transmit request received from the user terminal 170, the server management unit 113 may provide the user terminal 170 with at least one contents corresponding to the requested geographical address website. For example, when information on the requested geographical address website is included in the contents transmit request, the server management unit 113 may sequentially sort at least one contents corresponding to the requested geographical address website according to upload time information and provide the at least one user terminal 170 with the at least one contents. The server management unit 113 may classify at least one contents corresponding to the requested geographical address website according to the website operators who have uploaded the contents and provide the at least one user terminal 170_with the at least one contents. The requested geographical address website is a geographical address website selected by the user using the user terminal 170, which may be a geographical address website at which the user desires to receive the contents.

For example, if first contents C1 and second contents C2 are uploaded to the communication portal server 110 as shown in Table. 5, and when information on the first geographical address website W1 is included in the contents transmit request transmitted from the user terminal 170 to the server communication unit 115 as information on the requested geographical address website, the server management unit 113 may provide the user terminal 170 with the first contents C1 and the second contents C2 corresponding to the first geographical address website W1. Accordingly, at least one contents corresponding to the requested geographical address website input by the user may include all or some of the contents uploaded by at least one website operator granted with a management authority of the requested geographical address website in the past. For example, the server management unit 113 may sort the first contents C1 and the second contents C2 in order of a first upload time T1 and a second upload time T2 and provide the user terminal 170 with the first contents C1 and the second contents C2.

The communication portal server management method 300 according to another embodiment of the present disclosure is advantageous in that if a user selects the first geographical address website W1, the user terminal 170 may be provided with the contents uploaded by the first website operator N1, who is the previous website operator of the first geographical address website W1, as well as the contents uploaded by the second website operator N2, who is the current website operator of the first geographical address website W1. That is, the user may also be provided with the contents uploaded by the website operator terminal of the past through a geographical address website corresponding to the same geographical address.

That is, since the geographical address website represents a place itself corresponding to a certain geographical address, not a behavior performed at a certain geographical address, when a management authority on a place corresponding to a certain geographical address moves from one person to another person, the management authority of the geographical address website also belongs to the another person. The person newly granted with the management authority of the geographical address website may newly configure the geographical address website by uploading contents after connecting to the communication portal server 110 through the website operator terminal 150.

Meanwhile, the communication portal server management method according to the present disclosure may be performed by a non-statutory computer-readable medium in which a program for performing the communication portal server management method described above with reference to FIGS. 2 and 3 is recorded. In addition, the communication portal server management methods according to the present disclosure may be performed by a computer program stored in a medium, in combination with hardware, to execute the communication portal server management method described above with reference to FIGS. 2 and 3.

Figure 4:
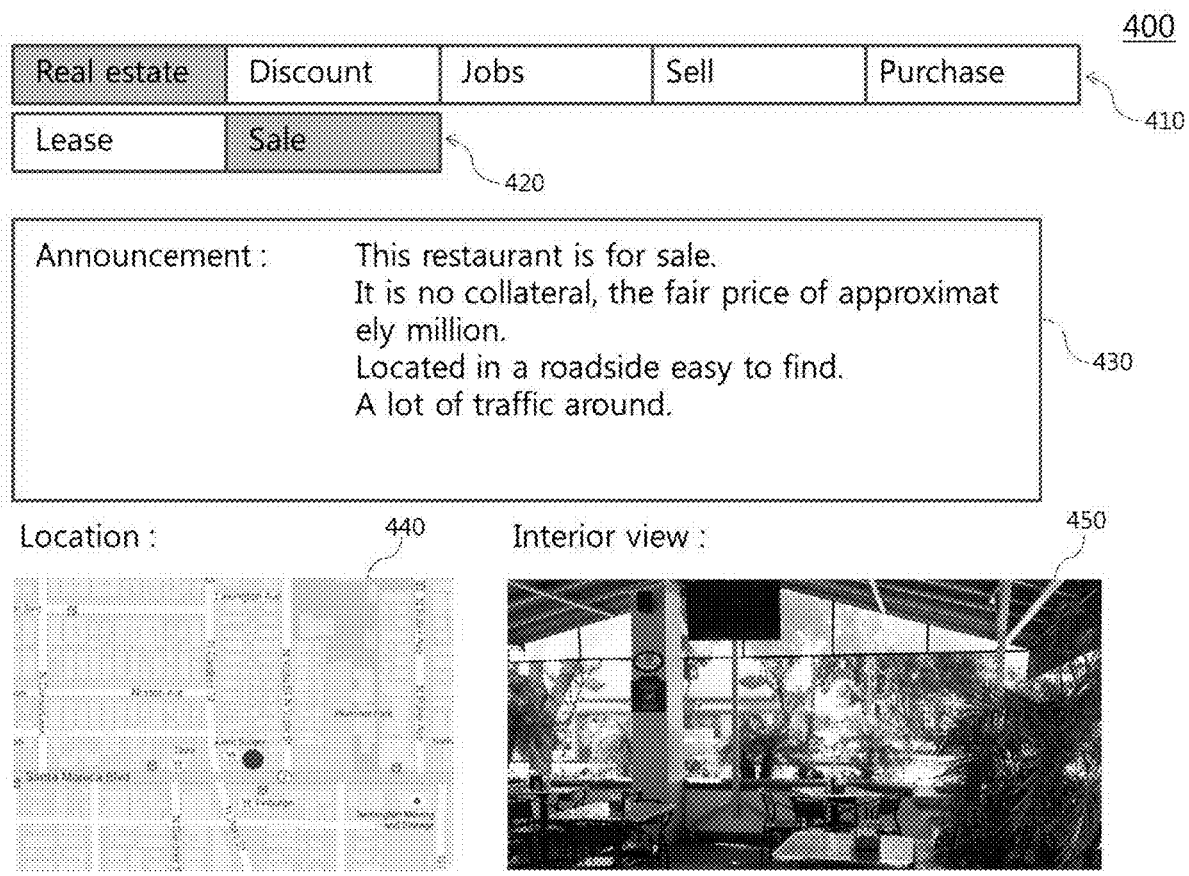
FIG. 4 is a schematic diagram showing a contents upload screen according to an embodiment of the present disclosure.

FIG. 4 is a schematic diagram showing a contents upload screen according to an embodiment of the present disclosure. The contents upload screen 400 shown in FIG. 4 may be provided to the website operator terminal 150 by the server management unit 113 of the communication portal server 110, and when a website operator enters the contents upload screen after connecting to the communication portal server 110 through the website operator terminal 150 and logging into the communication portal server 110, the contents upload screen 400 may be displayed through a display unit of the website operator terminal 150. The contents upload screen 400 may be a contents upload screen corresponding to a geographical address website for which the website operator has a management authority.

As shown in FIG. 4, the website operator may select any one contents classification among the contents classifications 410 including Real estate, Discount, Jobs, Sell and Purchase. In addition, when the website operator selects the Real Estate from the at least one contents classification 410, the website operator may select any one of Sale and Lease from the detailed contents classification 420. In addition, the website operator may input detailed description on corresponding contents in the detailed contents description 430. In addition, as shown in FIG. 4, the website operator may further input data on the location 440 and the interior view 450.

If the website operator inputs a contents upload request command through the website operator terminal 150, a contents upload request including information such as the contents classification 410, the detailed contents classification 420, the detailed contents description information 430, the location 440, the interior view 450 and the like may be generated and transmitted to the communication portal server 110. Accordingly, the real estate contents as shown in FIG. 4 may be uploaded to the communication portal server 110. Contents of the Discount, Jobs, Sell and Purchase may also be uploaded by the website operator in a similar way as shown in FIG. 4.

Figure 5:
FIG. 5 is a screenshot showing a first contents-providing-screen according to an embodiment of the present disclosure.

FIG. 5 is a screenshot showing a first contents-providing-screen according to an embodiment of the present disclosure. The first contents-providing-screen 500 shown in FIG. 5 may be provided to the user terminal 170 by the server management unit 113 of the communication portal server 110, and when a user connects to the communication portal server 110 through the user terminal 170 and enters the contents providing screen, the first contents-providing-screen 500 may be displayed through a display unit of the user terminal 170.

As shown in FIG. 5, the first contents-providing-screen 500 according to an embodiment of the present disclosure may display a map of an area input from a user through the user terminal 170 or an area corresponding to a position of the user terminal 170, and icons 510, 520, 530, 540 and 550 of contents uploaded in corresponding areas may be displayed at the locations corresponding to relevant geographical addresses.

Referring to FIG. 5, a first contents icon 510 may correspond to contents having contents classification of "Discount" and a discount rate of 20%, and a second contents icon 520 may correspond to contents having contents classification of "Jobs" and detailed contents classification of "Hire". A third contents icon 530 may correspond to contents having contents classification of "Sale", a fourth contents icon 540 may correspond to contents having contents classification of "Real Estate" and detailed contents classification of "Sale", and a fifth contents icon 550 may correspond to contents having contents classification of "Real Estate" and detailed contents classification of "Lease". The contents may be uploaded by an operator of a geographical address website corresponding to each geographical address.

In addition, according to another embodiment of the present disclosure, the first contents-providing-screen 500 according to an embodiment of the present disclosure may display only the contents corresponding to the contents classification input by a user. For example, if the user desires to search for only "Real Estate" contents and inputs a "Real Estate" contents providing command, icons 510, 520 and 530 of contents unrelated to "Real Estate" are not displayed on the first contents-providing-screen 500, and only the icons 540 and 550 related to "Real Estate" may be displayed on the first contents-providing-screen 500.

In addition, according to another embodiment of the present disclosure, the first contents-providing-screen 500 according to an embodiment of the present disclosure may display only the contents currently in progress. For example, contents of a transaction, a discount, an employment or the like which already has been finished may not be displayed on the first contents-providing-screen 500. To this end, whether or not corresponding contents are in progress or completed may be further stored in the database unit 119.

In addition, according to another embodiment of the present disclosure, the first contents-providing-screen 500 according to an embodiment of the present disclosure may display contents of a specific time point selected by a user. For example, if the user selects a specific time point in the past (e.g., one year ago), contents uploaded at the specific time point may be displayed on the first contents-providing-screen 500.

The communication portal server 110 according to an embodiment of the present disclosure may classify the contents stored in the database unit 119 into a variety of types as described above according to the contents transmit request received from the user terminal 170 and provide the user terminal 170 with the classified contents.

Figure 6:
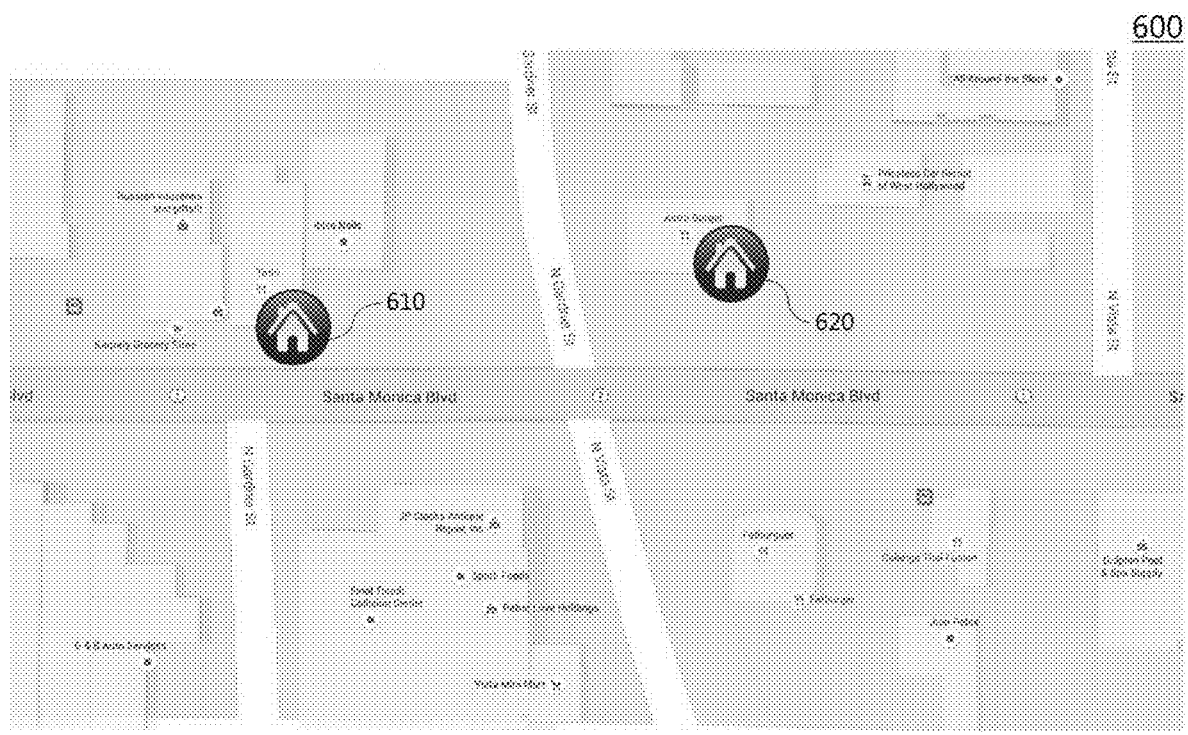
FIG. 6 is a screenshot showing a second contents-providing-screen according to another embodiment of the present disclosure.

FIG. 6 is a screenshot showing a second contents-providing-screen according to another embodiment of the present disclosure. The second contents-providing-screen 600 shown in FIG. 6 may be provided to the user terminal 170 by the server management unit 113 of the communication portal server 110, and when a user connects to the communication portal server 110 through the user terminal 170 and enters the contents providing screen, the second contents-providing-screen 600 may be displayed through a display unit of the user terminal 170.

As shown in FIG. 6, the second contents-providing-screen 600 according to another embodiment of the present disclosure may display a map of an area input from a user through the user terminal 170 or an area corresponding to a position of the user terminal 170, and icons 610 and 620 of geographical address websites existing in corresponding areas may be displayed at the locations corresponding to relevant geographical addresses.

If the user selects the geographical address website icon 610 or 620 through the user terminal 170, information on the selected geographical address website may be included in the contents transmit request and transmitted to the communication portal server 110. The communication portal server 110 may provide the user with detailed information on the geographical address website selected by the user through the user terminal 170. The detailed information on the geographical address website may include information on a current or previous website operator, the internet address (URL) of the geographical address website, contents uploaded through the geographical address website and the like.

As described above with reference to FIG. 3, all the contents uploaded by previous website operators may be included in the contents uploaded through the geographical address website. For example, when the first geographical address website W1 shown in Table 5 corresponds to the geographical address website icon 610 and first contents C1 and second contents C2 are uploaded to the database unit 119 of the communication portal server 110 as shown in Table 5, if the user selects the first geographical address website W1, the first contents C1 uploaded by the first website operator N1 who is the previous website operator of the first geographical address website W1, as well as the second contents C2 uploaded by the second website operator N2 who is the current website operator of the first geographical address website W1, may be provided through the user terminal 170. The contents may be provided to the user terminal 170 in a variety of forms such as a list, a grid and the like. Accordingly, the communication portal server 110 according to an embodiment of the present disclosure has an effect of providing contents information accumulated by previous website operators through a geographical address website corresponding to the same geographical address although operators of a geographical address website corresponding to each geographical address are changed.

In addition, according to another embodiment of the present disclosure, when the user requests information on a website operator of a geographical address website, the communication portal server 110 may provide the user terminal 170 with a geographical address change history of a corresponding website operator. For example, when the location of a business office of the first website operator N1 is changed from the first geographical address A1 to the second geographical address A2 as described above with reference to FIG. 3, if the user requests information on the first website operator N1, the communication portal server 110 may provide the user terminal 170 with information on the first geographical address A1, which is a previous geographical address of the first website operator N1, as well as information on the second geographical address A2, which is the current geographical address of the first website operator N1. In addition, if the user requests information on contents uploaded by a website operator of a geographical address website, the communication portal server 110 may provide the user terminal 170 with the contents uploaded by the corresponding website operator in the past.

Meanwhile, according to another embodiment of the present disclosure, the user may directly connect to a geographical address website by inputting an internet address (URL) of the geographical address website even when the user does not connect to the communication portal server 110 through the user terminal 170.

FIG. 7 is a schematic diagram showing a screen for providing past website information at a geographical address website according to an embodiment of the present disclosure. Referring to FIG. 7, the screen 700 is a screen that may be displayed if a user connects to a geographical address website corresponding to a specific geographical address, which may include a tab 710 corresponding to geographical address websites of the past existed in the specific geographical address.

If the user selects the tab 710, a list 720 arranging the geographical address websites of the past existing in a specific geographical address may be displayed. The geographical address websites of the past that are classified by the time period may be displayed in the list 720. For example, the geographical address websites of the past that are classified by the time period may be geographical address websites operated by different website operators. To this end, the database unit 119 of the communication portal server 110 may store website operator change history of each geographical address website. When website operators of a geographical address website are changed, the geographical address website operated by the previous website operator may be classified as a geographical address website of the past and added to the list 720. If the user selects the geographical address website of the past, the communication portal server 110 may provide the user terminal 170 with the contents uploaded by the website operator of the past at the geographical address website of the past.

As described above, the geographical address websites of the past may be geographical address websites having an internet address (URL) the same as that of the current geographical address website. Accordingly, the communication portal server 110 according to an embodiment of the present disclosure may provide information on contents accumulated by previous website operators through a geographical address website corresponding to the same geographical address although operators of a geographical address website corresponding to each geographical address have been changed.

According to another embodiment of the present disclosure, the current geographical address website operated by the current website operator may also be displayed in the list 720. If the user selects the current geographical address website, the user terminal 170 may be provided with only the contents uploaded by the current website operator.

FIGS. 8A and 8B are schematic diagrams showing a screen for providing past website information at a geographical address website according to another embodiment of the present disclosure. The screen 800 is a screen that may be displayed if a user connects to a geographical address website corresponding to a specific geographical address, which may include a tab 810 corresponding to geographical address websites of the past existed in the specific geographical address.

If the user selects the tab 810, a list 820 arranging the geographical address websites of the past existing in the specific geographical address may be displayed. The geographical address websites of the past classified by the period 823 of a website operator possessing a management authority may be displayed in the list 820, and a website operator 826 who has possessed a management authority of the geographical address website during a corresponding period may be displayed on the right side of each period 823.

FIG. 8A is a view showing that a geographical address website corresponding to the screen 800 is managed by a website operator operating the restaurant "Astro Burger" from Mar. 8, 2013 until present. That is, the restaurant "Astro Burger" is presently operated at a geographical address corresponding to the geographical address website displayed on the screen 800.

FIG. 8B is a view showing a screen of a geographical address website when the restaurant "Astro Burger" moves to another geographical address and restaurant "Tinto" moves to the geographical address where restaurant "Astro Burger" is operated. If the website operator operating the restaurant "Tinto" completes authentication on the new geographical address, a management authority of the geographical address website displayed on the screen 800 may be granted to the website operator operating the restaurant "Tinto". Accordingly, as shown in FIG. 8B, the restaurant "Tinto" may be added to the list 820 of the screen 800. A user may know through the screen 800 that the restaurant "Astro Burger" is not operated any more at geographical address corresponding to the geographical address website displayed on the screen 800 and the restaurant "Tinto" is in operation.

If the user selects any one website operator 826 from the list 800 through the user terminal 170, the user may be provided with contents uploaded by the selected website operator.

Meanwhile, all the screens shown in FIGS. 4 to 8A and 8B are only for illustrative purposes, and the layout or configuration of the screen may be diversely modified within the scope well-known to those skilled in the art.

The diverse embodiments disclosed in this specification may be implemented by hardware, middleware, microcode, software and/or a combination thereof. For instance, the diverse embodiments may be implemented within one or more of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and other electronic units designed to perform the functions presented herein or a combination thereof.

In addition, for example, the diverse embodiments may be recorded or encoded in computer-readable media including commands. The commands recorded or encoded in the computer-readable media may make a programmable processor or other processors perform a method when, for example, the commands are executed. The computer-readable media include all kinds of communication media including a computer storage medium and a certain medium which makes it easy to transfer a computer program from one place to another place. The storage medium may be a certain available medium accessible by a computer. For example, such computer-readable media may include RAM, ROM, EEPROM, CD-ROM or other optical disk storage media, magnetic disk storage media or other magnetic storage devices, or other certain media which may be used to return or store a desired program code in the form of commands or data structures accessible by a computer.

Such hardware, software, firmware and the like may be implemented within the same device or individual devices to support diverse operations and functions described in this specification. Additionally, the constitutional elements, units, modules, components and the like described as "unit" in the present disclosure may be implemented together or individually as interoperable logic devices although individual. Description of different features of the modules, units and the like is intended to emphasize functional embodiments different from each other and does not necessarily mean that these should be realized by individual hardware and software components. Rather, a function related to one or more modules or units may be performed by individual hardware and software components or may be integrated in common or individual hardware and software components.

Although operations are shown in the figures in a specific order, it should not be understood in such a way that these operations need to be performed in a specific order or a sequential order, or that all the operations shown in the figures should be performed to accomplish a desired result. In a certain environment, multi-tasking and parallel processing may be advantageous. Furthermore, it should not be understood in such a way that classification of the diverse constitutional elements shown in the embodiment described above is needed in all embodiments. It should also be understood that the described constitutional elements may be generally integrated together as a single software product or packaged as a plurality of software products.

The communication portal management system, the communication portal server, and the management method thereof based on a geographical address according to the present disclosure are effective in that the communication portal server provides each website operator with a geographical address website corresponding to a geographical address of the website operator, and if a website operator terminal for operating the geographical address website connects to the communication portal server and transmits a contents upload request, the communication portal server matches contents included in the contents upload request to the geographical address website and stores the contents in a database, and, in addition, if the communication portal server receives a request for specific contents from an internet user, the communication portal server provides the internet user with contents corresponding to the request.

In addition, the communication portal management system, the communication portal server, and the management method thereof based on a geographical address according to the present disclosure are effective in that if a website operator corresponding to a geographical address is newly changed, the communication portal server grants a management authority of a geographical address website corresponding to the geographical address to a newly changed website operator.

In addition, the communication portal management system, the communication portal server, and the management method thereof based on a geographical address according to the present disclosure are effective in that since geographical address websites are managed by the communication portal server, information accumulated by previous website operators exists in the communication portal server although the management authority of a geographical address website moves from one person to another person, and thus information generated in the past at a place corresponding to a certain geographical address may also be provided to internet users.

It is to be understood that the exemplary embodiments described herein are that for presently preferred embodiments and thus should be considered in a descriptive sense only and not for purposes of limitation. Descriptions of features or aspects within each embodiment should typically be considered as available for other similar features or aspects in other embodiments.

What is claimed is:

1. A communication portal management system, in which a communication portal server provides each website operator with a geographical address website corresponding to a geographical address of each website operator, the system comprising:
   a geographical address website management processor assigning a management authority of a first geographical address website to a first website operator who has a control of a business place located at a first geographical address;
   a server communication processor receiving a contents upload request from the first website operator via a first website operator terminal; and
   a server management processor storing contents information included in the contents upload request in a database, wherein the contents information and the geographical address website are matched in response to the contents upload request,
   wherein the first website operator terminal communicates with a communication portal server to upload contents according to a predetermined conditions of the management authority, and
   wherein a user terminal transmits a contents transmit request input from a user to the communication portal server and receives contents in response to the contents transmit request from contents uploaded in the communication portal server,
   wherein when the first website operator is changed to a second website operator based on the control of the business place at the first geographical address changing from the first website operator to the second website operator, the geographical address website management processor assigns the management authority of the first geographical address website to the second website operator and withdraws the management authority of the first geographical address website from the first website operator, and the server management processor provides the user terminal with contents uploaded by the second website operator along with contents uploaded by the first website operator in response to the contents transmit request.

2. A communication portal server configured to provide each website operator with a geographical address website corresponding to a geographical address of each website operator, the server comprising:
   a geographical address website management processor assigning a management authority of a first geographical address website to a first website operator who has a control of a business place located at a first geographical address;
   a server communication processor receiving a first contents upload request from the first website operator via a first website operator terminal; and
   a server management processor storing first contents information included in the first contents upload request in a database, wherein the first contents information and the first geographical address website are matched in response to the first contents upload request,
   wherein when the first website operator is changed to a second website operator based on the control of the business place at the first geographical address changing from the first website operator to the second website operator, the geographical address website management processor assigns the management authority of the first geographical address website to the second website operator and withdraws the management authority of the first geographical address website from the first website operator, and the server management processor provides a user terminal with contents uploaded by the second website operator along with contents uploaded by the first website operator.

3. The communication portal server of claim 2, wherein when the geographical address corresponding to the first website operator is authenticated as the first geographical address by a geographical address authentication processor, the geographical address website management processor provides the first website operator with the first geographical address website.

4. The communication portal server of claim 2, wherein the first contents information includes at least one of geographical address information, geographical address website information, website operator information, contents classification information, detailed contents classification information, detailed contents description information, and upload time information.

5. The communication portal server of claim 2, wherein the first contents upload request is generated from the first website operator terminal in accordance with a contents upload format provided by the server management processor.

6. The communication portal server of claim 2, wherein when the first geographical address corresponding to the first website operator is changed to a second geographical address, the geographical address website management processor assigns a management authority of a second geographical address website to the first website operator, wherein the second geographical address website corresponds to the second geographical address.

7. The communication portal server of claim 6, wherein when the second geographical address corresponding to the second website operator is changed to the first geographical address, the geographical address website management processor assigns the management authority of the first geographical address website to the second website operator.

8. The communication portal server of claim 7, wherein the second website operator uses a second website operator terminal, and wherein when the server communication processor receives a second contents upload request from the second website operator terminal, the server management processor matches second contents information corresponding to the second contents upload request to the first geographical address website and stores the second contents information in the database.

9. The communication portal server of claim 2, wherein the server communication processor receives a contents transmit request from the user terminal, and the server management processor provides the user terminal with at least one contents in response to the contents transmit request received from the user terminal to the server communication processor.

10. The communication portal server of claim 9, wherein upon receipt of the contents transmit request, the server management processor provides the user terminal with the at least one contents corresponding to the contents transmit request according to upload time information or a website operator who has uploaded the at least one contents.

11. The communication portal server of claim 9, wherein the contents transmit request includes information of a requested geographical address website, which provides the at least one contents, and wherein the server management processor provides the user terminal with the at least one contents corresponding to the requested geographical address website according to upload time information or a website operator who has uploaded the contents.

12. The communication portal server of claim 11, wherein the at least one contents from the requested geographical address website includes contents uploaded by at least one current or previous website operator assigned with a management authority of the requested geographical address website.

13. A method for managing a communication portal server configured to provide each website operator with a geographical address website corresponding to a geographical address of each website operator, the method comprising:
assigning, by a geographical address website management processor, a management authority of a first geographical address website to a first website operator who has a control of a business place located at a first geographical address;
receiving, by a server communication processor, a first contents upload request from the first website operator via a first website operator terminal;
matching, by a server management processor, first contents information to the first geographical address website in response to the first contents upload request; and
storing, by a server management processor, the first contents information in a database,
wherein when the first website operator is changed to a second website operator based on the control of the business place at the first geographical address changing from the first website operator to the second website operator, the geographical address website management processor assigns the management authority of the first geographical address website to the second website operator and withdraws the management authority of the first geographical address website from the first website operator, and the server management processor provides a user terminal with contents uploaded by the second website operator along with contents uploaded by the first website operator.

14. The method of claim 13, wherein when the geographical address corresponding to the first website operator is authenticated as the first geographical address by a geographical address authentication processor, the geographical address website management processor provides the first website operator with the first geographical address website.

15. The method of claim 13, wherein the first contents information includes at least one of geographical address information, geographical address website information, website operator information, contents classification information, detailed contents classification information, detailed contents description information and upload time information.

16. The method of claim 13, wherein the first contents upload request is generated from the first website operator terminal in accordance with a contents upload format provided by the server management processor.

17. The method of claim 13, further comprising:
when the first geographical address corresponding to the first website operator is changed to a second geographical address, assigning, by the geographical address website management processor, a management authority of a second geographical address website corresponding to the second geographical address to the first website operator.

18. The method of claim 17, further comprising:
when the second geographical address corresponding to the second website operator is changed to the first geographical address, assigning, by the geographical address website management processor, the management authority of the first geographical address website to the second website operator.

19. The method of claim 18, further comprising:
when the server communication processor receives a second contents upload request from a second website operator terminal, matching second contents information corresponding to the second contents upload request to the first geographical address website, and storing, by the server management processor, the second contents information in the database.

20. The method of claim 13, further comprising:
receiving, by the server communication processor, a contents transmit request from the user terminal, and
providing, by the server management processor, the user terminal with at least one contents corresponding to the contents transmit request.

21. The method of claim 20, wherein upon receipt of the contents transmit request, the server management processor provides the user terminal with at least one contents corresponding to the contents transmit request according to upload time information or a website operator who has uploaded the at least one contents.

22. The method of claim 20, wherein when information of a requested geographical address website is included in the contents transmit request, the server management processor provides the user terminal with at least one contents corresponding to the requested geographical address website according to upload time information or a website operator who has uploaded the contents.

23. The method of claim 22, wherein the at least one contents corresponding to the requested geographical address website includes contents uploaded by at least one current or previous website operator assigned with a management authority of the requested geographical address website.

24. The method of claim 13, wherein when a website operator corresponding to the first geographical address is changed, the geographical address website management processor assigns the management authority of the first geographical address website corresponding to the first geographical address to a website operator newly corresponding to the first geographical address, and the server management processor provides a user terminal with contents uploaded and accumulated by at least one current or previous website operator assigned with the management authority of the first geographical address website.

25. A non-transitory computer-readable medium having stored thereon instructions that, if executed by a process, causes at least one processor to execute a method for managing a communication portal server configured to provide each website operator with a geographical address website corresponding to a geographical address of each website operator, the method comprising:
assigning, by a geographical address website management processor, a management authority of a first geographical address website to a first website operator who has a control of a business place located at a first geographical address;

receiving, by a server communication processor, a first contents upload request from the first website operator via a first website operator terminal;

matching, by a server management processor, first contents information to the first geographical address website in response to the first contents upload request; and storing, by a server management processor, the first contents information in a database, wherein when the first website operator is changed to a second website operator based on the control of the business place at the first geographical address changing from the first website operator to the second website operator, the geographical address website management processor assigns the management authority of the first geographical address website to the second website operator and withdraws the management authority of the first geographical address website from the first website operator, and the server management processor provides a user terminal with contents uploaded by the second website operator along with contents uploaded by the first website operator.

* * * * *